(12) United States Patent
Qin et al.

(10) Patent No.: US 11,061,772 B2
(45) Date of Patent: Jul. 13, 2021

(54) FPGA ACCELERATION SYSTEM FOR MSR CODES

(71) Applicant: Samsung Electronics Co., Ltd., Suwon-si (KR)

(72) Inventors: Mian Qin, College Station, TX (US); Joo Hwan Lee, San Jose, CA (US); Rekha Pitchumani, Fairfax, CA (US); Yang Seok Ki, Palo Alto, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/271,777

(22) Filed: Feb. 8, 2019

(65) Prior Publication Data

US 2020/0192757 A1 Jun. 18, 2020

Related U.S. Application Data

(60) Provisional application No. 62/780,185, filed on Dec. 14, 2018.

(51) Int. Cl.
*G06F 11/10* (2006.01)
*G06F 13/28* (2006.01)

(52) U.S. Cl.
CPC .......... *G06F 11/1076* (2013.01); *G06F 13/28* (2013.01)

(58) Field of Classification Search
CPC ............................. G06F 11/1076; G06F 13/28
See application file for complete search history.

(56) References Cited

U.S. PATENT DOCUMENTS

| | | | |
|---|---|---|---|
| 9,710,330 B2 | 7/2017 | Cronie | |
| 9,898,196 B1 | 2/2018 | Karamcheti et al. | |
| 2014/0317222 A1* | 10/2014 | Li | H03M 13/033 709/213 |
| 2017/0179979 A1 | 6/2017 | Hussain | |
| 2018/0060169 A1 | 3/2018 | Hussain et al. | |

(Continued)

OTHER PUBLICATIONS

Bates, Stephen, et al., "An NVMe-based Offload Engine for Storage Acceleration," SNIA, SDC 2017, Networked Storage, Presentation, Sep. 11, 2017, 24 pages, [retrieved on Feb. 16, 2021], retrieved from Internet: <URL: https://www.snia.org/educational-library/nvme-based-offload-engine-storage-acceleration-2017>.

(Continued)

*Primary Examiner* — Guy J Lamarre
(74) *Attorney, Agent, or Firm* — Renaissance IP Law Group LLP

(57) ABSTRACT

According to one general aspect, an apparatus may include a host interface circuit configured to receive offloading instructions from a host processing device, wherein the offloading instructions instruct the apparatus to compute an error correction code associated with a plurality of data elements. The apparatus may include a memory interface circuit configured to receive the plurality of data elements. The apparatus may include a plurality of memory buffer circuits configured to temporarily store the plurality of data elements. The apparatus may include a plurality of error code computation circuits configured to, at least in part, compute the error correction code without additional processing by the host processing device.

20 Claims, 7 Drawing Sheets

(56) References Cited

U.S. PATENT DOCUMENTS

2018/0300201 A1* 10/2018 Koker ................ G06F 11/1068

OTHER PUBLICATIONS

Bates, Stephen, et al., screen captures from YouTube video clip entitled "SDC 2017 an NVMe-based Offload Engine for Storage Acceleration—Stephen Bates and Sean Gibb" 24 pages, uploaded on Sep. 29, 2017 by user SNIAVideo, [retrieved on Feb. 16, 2021], retrieved from Internet: <url: https://www.youtube.com/watch?v=OAkHTIHmAvl&feature=emb_logo>.

* cited by examiner

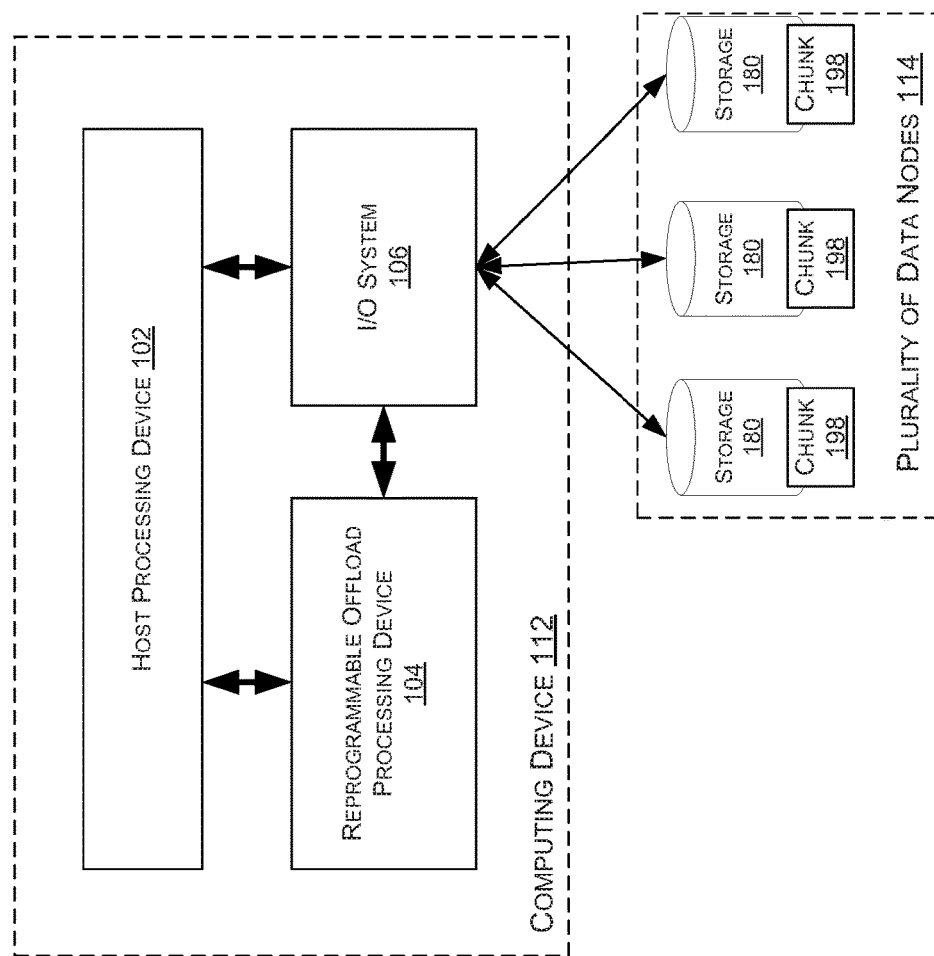

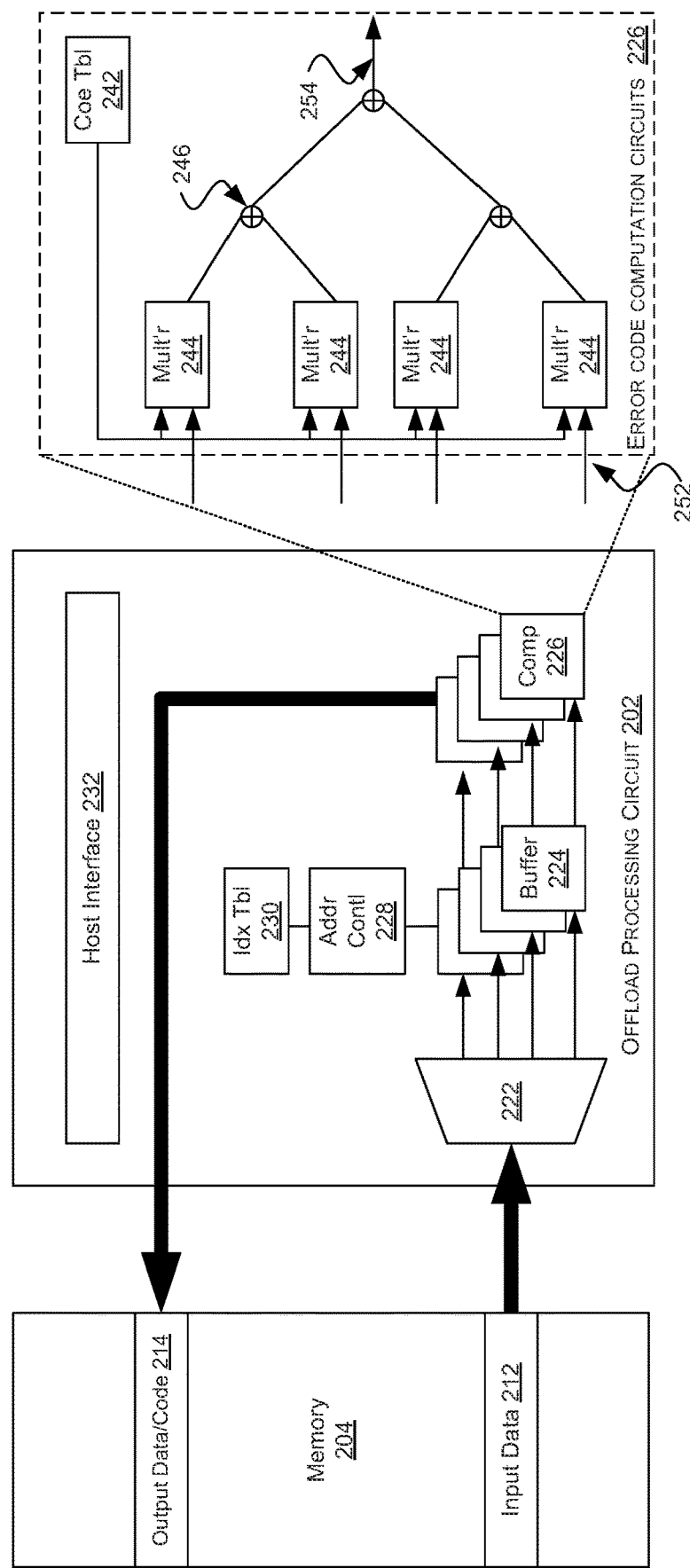

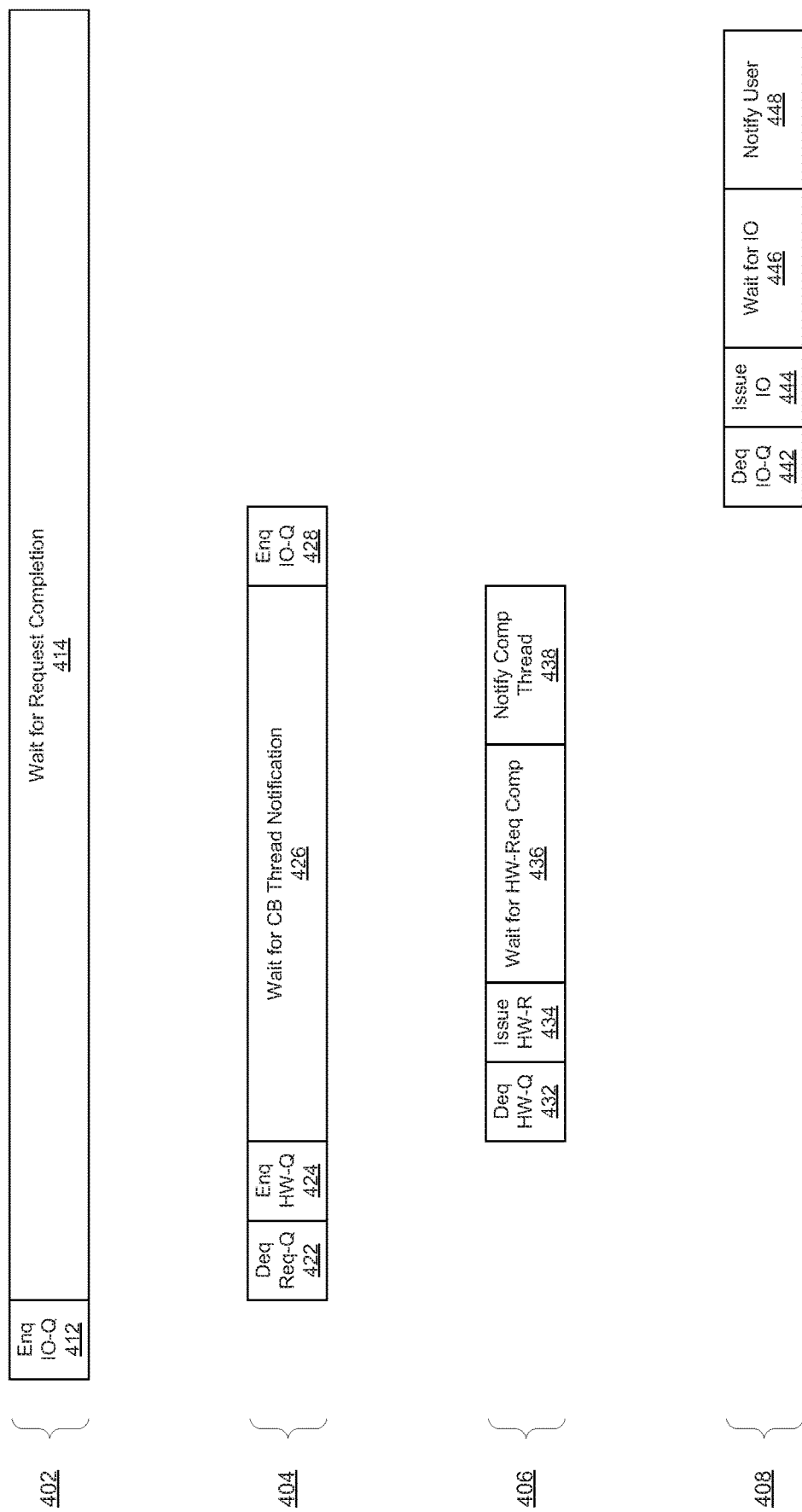

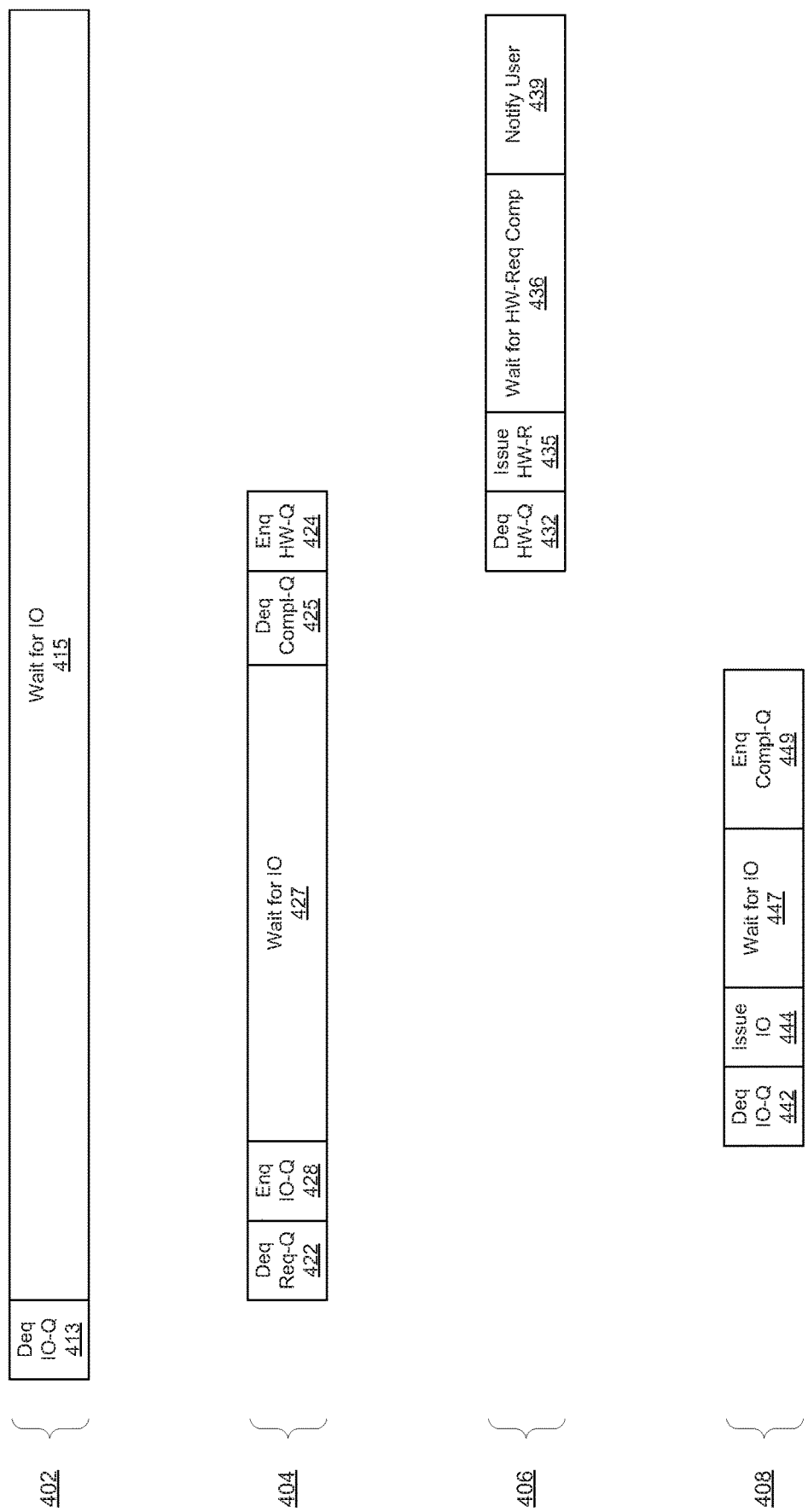

FPGA ACCELERATION SYSTEM FOR MSR CODES

CROSS-REFERENCE TO RELATED APPLICATION

This application claims priority under 35 U.S.C. § 119 to Provisional Patent Application Ser. No. 62/780,185, entitled "FPGA ACCELERATION SYSTEM FOR MSR CODES" filed on Dec. 14, 2018. The subject matter of this earlier filed application is hereby incorporated by reference.

TECHNICAL FIELD

This description relates to data storage, and more specifically to a system, device and/or method for the acceleration of error correction codes.

BACKGROUND

In coding theory, an erasure code is a forward error correction (FEC) code under the assumption of bit erasures (rather than bit errors), which transforms a message of k symbols into a longer message (code word) with n symbols such that the original message can be recovered from a subset of the n symbols. The fraction r=k/n is called the code rate. The fraction k'/k, where k' denotes the number of symbols required for recovery, is called reception efficiency.

Regenerating codes address the issue of rebuilding (also called repairing) lost encoded fragments from existing encoded fragments. In more detail, regenerating codes are a class of codes that aim to reduce the amount of download during repair, while retaining the storage efficiency of traditional maximum distance separable (MDS) code. This issue occurs in distributed storage systems where communication to maintain encoded redundancy is a problem.

A distributed storage system is generally is a computer network where information is stored on more than one node or device, often in a replicated fashion. It is often used to refer to either a distributed database where users store information on a number of nodes, or a computer network in which users store information on a number of peer network nodes. Distributed storage systems typically use an error detection and correction technique. Some distributed storage system use forward error correction techniques to recover the original file, chunk, or blob when parts of that file are damaged or unavailable. Others try again to download that file from a different mirror.

SUMMARY

According to one general aspect, an apparatus may include a host interface circuit configured to receive offloading instructions from a host processing device, wherein the offloading instructions instruct the apparatus to compute an error correction code associated with a plurality of data elements. The apparatus may include a memory interface circuit configured to receive the plurality of data elements. The apparatus may include a plurality of memory buffer circuits configured to temporarily store the plurality of data elements. The apparatus may include a plurality of error code computation circuits configured to, at least in part, compute the error correction code without additional processing by the host processing device.

According to another general aspect, a system may include a memory configured to store a plurality of data elements. The system may include a host processing device configured to offload a computation of an error correction code to a reprogrammable processing device. The system may include the reprogrammable processing device which may be configured to compute the error correction code based, at least in part, upon a plurality of data elements. The reprogrammable processing device may include a reconfigurable pipeline that computes, at least in part, the error correction code and it reconfigured based upon a number of the plurality of data elements.

According to another general aspect, an apparatus may include a host processing device configured to offload a computation of an error correction code to an offload processing device. The apparatus may include an input/output (I/O) system configured to read and write data elements to a plurality of storage devices. The apparatus may include the offload processing device which may be configured to compute the error correction code based, at least in part, upon a plurality of data elements. The offload processing device may include a memory interface circuit configured to receive the plurality of data elements. The offload processing device may include a plurality of memory buffer circuits configured to temporarily store the plurality of data elements. The offload processing device may include a plurality of error code computation circuits configured to, at least in part, compute the error correction code without additional processing by the host processing device.

The details of one or more implementations are set forth in the accompanying drawings and the description below. Other features will be apparent from the description and drawings, and from the claims.

A system and/or method for data storage, and more specifically to a system, device and/or method for the acceleration of error correction codes, substantially as shown in and/or described in connection with at least one of the figures, as set forth more completely in the claims.

BRIEF DESCRIPTION OF THE DRAWINGS

FIG. 1 is a block diagram of an example embodiment of a system in accordance with the disclosed subject matter.

FIG. 2 is a block diagram of an example embodiment of a system in accordance with the disclosed subject matter.

FIGS. 4A & 4B are timing diagrams of an example embodiment of a system in accordance with the disclosed subject matter.

Like reference symbols in the various drawings indicate like elements.

DETAILED DESCRIPTION

Figure 3A:
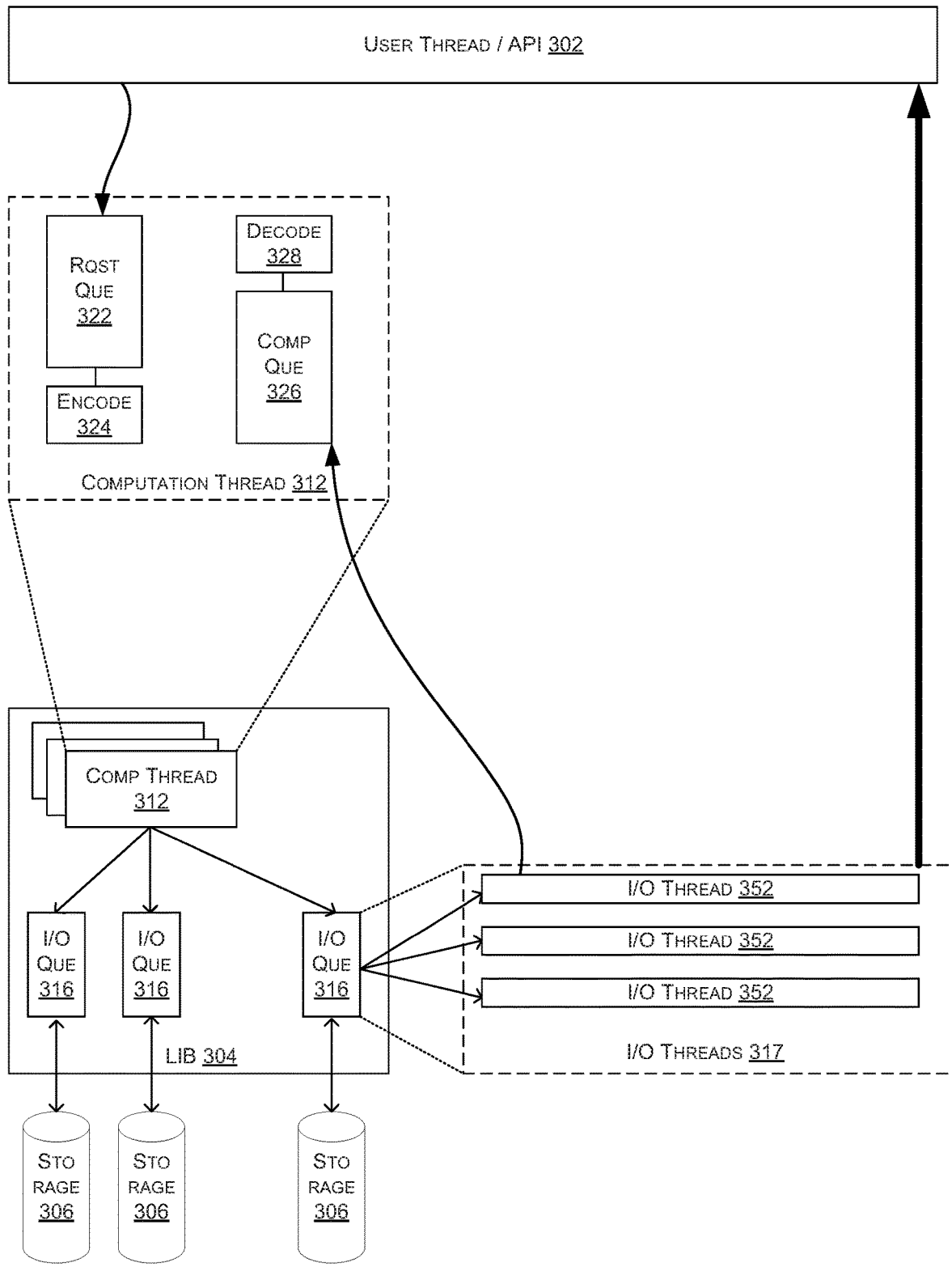
FIGS. 3A & 3B are block diagrams of example embodiments of a system in accordance with the prior art.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In the illustrated embodiment, the system 100 may include a distributed storage system 114 that stores data across a plurality of nodes or storage devices 180.

Distributed storage systems are often used to provide large-scale reliability storage. Often this is accomplished by spreading redundancy or error correction (e.g., parity) across a large number of nodes or storage devices. However, when a node or storage device goes off-line (e.g., due to a network error, hardware failure, etc.) the data become suspect as possibly corrupt, or at least having a reduced level of redundancy. The more distributed a storage system is the more frequently this occurs.

A number of techniques may be employed to protect against such an occurrence (e.g., mirroring, Reed-Solomon encoding), but the disclosed subject matter is not limited to a specific encoding. In such an embodiment, the missing piece of data (a chunk) is regenerated or reconstructed using a formula based upon the remaining pieces of data.

In the illustrated embodiment, the system 100 may include one or more host or computing devices 112 configured to manage the distributed storage system or plurality of data nodes 114. The computing device 112 may include a computing device (e.g., computer, server, virtual machine) that reads and writes to and from the storage system 180. When an error (e.g., a missing chunk of data) occurs, the computing device 112 is generally responsible for detecting and, if possible, repairing the error.

In various embodiments, the computing device 112 may include a computing device, such as, for example, a laptop, desktop, workstation, personal digital assistant, smartphone, tablet, system-on-a-chip (SoC), and other appropriate computers or a virtual machine or virtual computing device thereof. In various embodiments, the computing device 112 may be used by a user (not shown). In various embodiments, the computing device 112 may include a processor 102 configured to execute one or more machine executable instructions or pieces of software, firmware, or a combination thereof. The computing device 112 may include, in some embodiments, a memory (not shown) configured to store one or more pieces of data, either temporarily, permanently, semi-permanently, or a combination thereof. Further, the memory may include volatile memory, non-volatile memory or a combination thereof. In various embodiments, the computing device 112 may include or communicate with a storage medium 114 configured to store data in a semi-permanent or substantially permanent form.

In the illustrated embodiment, each data set may be broken down or fragmented by the computing device 112 into a plurality of smaller pieces of data or chunks 198. In the illustrated embodiment, the data 199 is divided into chunks 198 (e.g., D1, D2, D3, and D4). Further, in various embodiments, the computing device 112 may apply some form of redundancy to the data chunks 198, such as parity chunks (e.g., named P1 and P2, and also numbered 198 as they are also chunks).

In the parlance of the art, the number of original data chunks 198 (D1, D2, D3, and D4) are described as the variable K or k. Likewise, the number of redundant data chunks 198 (P1 and P2) are described as the variable R or r. Such that the total number of chunks 198 is K+R. In the illustrated embodiment, K equal 4, R equals 2, and K+R equals 6; although, it is understood that the above is merely an illustrative example to which the disclosed subject matter is not limited.

In the illustrated embodiment, the computing device 112 causes each of these chunks 198 (both original and redundant) to be stored on respective nodes or storage devices of the storage system 114. In various embodiments, the number of storage devices 180 may not equal the number of chunks 198.

In various embodiments, a chunk 198 may go missing (e.g., network or hardware failure) or may otherwise be associated with an error. In the illustrated embodiment, let us say a chunk 198 (and the respective storage device 180) suddenly become unavailable. The computing device 112 upon detecting the error, may attempt to recreate the missing chunk 198 or otherwise correct the error.

In such an embodiment, if one chunk fails, and there were K (e.g., 4) total chunks in the original data, at-least K (e.g., 4) nodes or computing device 180 have to send information to the host device 112 to recover of the failed chunk. Note, these K (e.g., 4) chunks may come from any of the K+R (e.g., 6) chunks. For example, chunks 198 D1, D2, D4, and P1 may be used to recreate the missing chunk 198 D3.

Regeneration codes reduces the repair bandwidth by sending less than a full chunk size information from D nodes, where typically D>K. In other words, by use of a clever formula, the computing device 112 may be able to recreate the missing chunk 198 D3, by using, not the full chunks 198 D1, D2, D4, and P1, but by using only a part of the 198 D1, D2, D4, P1, and P2. A regeneration code generally takes information from more storage device 180, but it takes less information from each storage device 180 than a non-regenerative code would. It is understood that the above is merely one illustrative example to which the disclosed subject matter is not limited.

For example, if 6 chunks of data were used (K=6) and 6 chunks of redundancy were used (R=6 and K+R=12) and each chunk was 16 MB in size, the standard Reed-Solomon (RS) error correction encoding scheme would require that 6 (K) 16 MB chunks be sent to the host device or 96 MB of data be transmitted to correct a missing 16 MB chunk. Conversely, if a regenerative technique was used, portions of all 12 (K+R or D, in this case) chunks would be read, but that since only a portion of each chunk was used (e.g., 2.7 MB) the total amount transmitted to the host device may be lower (e.g., 29.7 MB).

Often regeneration codes have a storage and bandwidth tradeoff. in various embodiments, in general, there are two classes or groups of regenerative codes. If storage overhead is minimal, they are called Minimum Storage Regeneration (MSR) codes. If repair bandwidth is minimal for added storage overhead, they are called Minimum Bandwidth Regeneration (MBR) codes. Within these broad categories, various specific techniques or formulas may be employed to perform the regenerative codes. It is understood that the above are merely a few illustrative examples to which the disclosed subject matter is not limited.

Returning to FIG. 1, In the illustrated embodiment, the storage system 114 may include a plurality of storage devices 114. Each storage device 114 may be configured to store data, in chunks or otherwise. In the illustrated embodiment, the storage devices 114 may be relatively traditional storage devices, such as hard drives, solid state drives, or even volatile memories.

In the illustrated embodiment, the system 100 may also include the computing device 112, as described above. In such an embodiment, the computing device 112 may include a host processor or processing device 102. In various embodiments, the host processing device 102 may include a central processing unit (CPU), a device specific or controller processor (e.g., as may be found in a storage device), or other processing circuitry.

In the illustrated embodiment, the computing device 112 may also include an input/output (I/O) interface or system 106. In various embodiments, the I/O system 106 may be configured to communicate with the storage system 114. In some embodiments, the I/O system 106 may be at least partially integrated with the host processor 102. In another embodiment, the I/O system 106 may include a memory management unit (MMU) or other component of what is often considered a chipset. It is understood that the above are merely a few illustrative examples to which the disclosed subject matter is not limited.

In the illustrated embodiment, the computing device 112 may include a reprogrammable offload processing device (ROPD) 104. In various embodiments, this ROPD 104 may include special purpose logic circuitry, e.g., an FPGA (field programmable gate array) or an ASIC (application-specific integrated circuit). In various embodiments, the ROPD 104 may be programmable by an external device, such that its programming is generally fixed. In another embodiment, the ROPD 104 may be dynamically reprogrammable by the host processor 102 or other device, such that its circuitry (e.g., pipeline) may be dynamically adjusted based upon runtime conditions. It is understood that the above are merely a few illustrative examples to which the disclosed subject matter is not limited.

As described above, while it is generally the host processor 102's responsibility to compute the needed error correction codes (e.g., parity chucks, recreation of missing data chucks), in the illustrated embodiment, the host processor 102 may choose or be configured to offload or delegate that task, in whole or part, to the ROPD 104.

Traditionally, the computation of the error correction codes by the host processor 102 (often controlled by software) is an expensive task. Often the CPU architecture (e.g., Symmetric multiprocessing (SMP), Single instruction, multiple data (SIMD)) has limited amount of parallelism compared to the parallel characteristic of MSR (or other) code construction and rebuild. Also, the memory access pattern needed to create the error correction code (i.e., accessing all the chunks 198) lacks locality. The random access for the data elements and streaming pattern for the data inside each data element does not provide much locality thus leading to poor cache performance and a degradation of the overall encode/decode performance. Thus, the concept of employing traditional software leads to high processor and memory bandwidth utilization and prevents utilization of the host processor 102 that can be better used for other tasks. In the illustrated embodiment, the system 100 provides an acceleration system for error correction coding (e.g., construction and rebuilding) that addresses, at least these issues.

In the illustrated embodiment, the host processor 102 may be configured to offload the error correction coding to the hardware accelerator or ROPD 104. In such an embodiment, when asked to perform the error correction coding the host processor 102 may communicate this request to the ROPD 104. The RPOD 104 may then utilize the I/O system 106 to access the data elements (e.g., chunks 198 or other sizes of data). Upon completion, the ROPD 104 may communicate the finality of the operation to the host processor 102, which may then access the data, error correction code, or simply proceed with its operations. In such an embodiment, while the RPOD 104 is computing the error correction code, the host processor 102 may perform another task.

In various embodiments, the host processor 102 and the ROPD 104 may communicate via direct memory access (DMA). In one embodiment, this may involve a mapped portion of a memory with in the I/O system 106. In another embodiment, this may involve a direct communication between the devices 102 and 104. Likewise, the I/O system 106 and the RPOD 104 may communicate via a peer-to-peer DMA protocol. It is understood that the above are merely a few illustrative examples to which the disclosed subject matter is not limited.

FIG. 2 is a block diagram of an example embodiment of a system 200 in accordance with the disclosed subject matter. In various embodiments, the system 200 may include a reprogrammable offload processing device (RPOD), as described above.

In the illustrated embodiment, the system 200 may include an offload processing circuit 202. In various embodiments, this offload processing circuit 202 may be reprogrammable, as described above. In such an embodiment, offload processing circuit 202 may be configured to compute the error correction code without additional processing by a host processing device.

In the illustrated embodiment, the offload processing circuit 202 include a host interface 232 configured to communicate with the host processing device or processor. In various embodiments, the host processor may be external to the system 200 or integrated as a separate logic block (e.g., as part of system-on-a-chip (SoC)). In various embodiments, the host interface 232 may communicate, at least partially or wholly via DMA.

In the illustrated embodiment, the system 200 may include or interact with a memory circuit or unit 204. In some embodiments, the memory 204 may include system memory, such double data rate (DDR) synchronous dynamic random access memory (SDRAM); although, it is understood that the above is merely one illustrative example to which the disclosed subject matter is not limited. In such an embodiment, the memory 204 may be configured to store the data elements (e.g., information or parity chunks) used for error correction code computation (e.g., creation or rebuilding).

In one embodiment, for the creation or encode procedure, the host processor may send the data object (e.g., all the information chunks) that need to be encoded to the memory unit 204. In such an embodiment, these data elements may be stored as the input 212. Then the offload processing circuit 202 may compute the parity chunks (a form of error correction code) and write them back to memory unit 204 (at output 214). Finally, the information and parity chunks may be distributed (by the I/O system or host processing device) to different storage nodes.

In another embodiment, for the rebuilding or decode procedure, the surviving information data elements and parity data elements may first be retrieved and stored in the memory unit 204 (as input 212). Then the offload processing unit 202 may compute the rebuild chunk (the error correction code) and write that to the memory unit 204 (at output 214). Finally, the rebuilt chunk is transferred to the host processing device.

In the illustrated embodiment, the offload processing circuit 202 may include a memory interface circuit 222 that is configured to communicate with the memory 204. In the illustrated embodiment, the memory interface circuit 222 is shown as a multiplexer (MUX) that may receive data elements. Likewise, a de-multiplexer (DeMUX) may write data elements to the memory 204. It is understood that the above is merely one illustrative example to which the disclosed subject matter is not limited.

The offload processing circuit 202 may include a plurality of memory buffer circuits 224 configured to temporarily store the plurality of data elements. In one specific embodiment, the input data 212 may arrive at the offload processing circuit 202 in efficient 512-bit grouping, but the elements themselves may only be 8-bits. In such an embodiment, the memory interface circuit 222 may split the input 212 into 64 data elements and store them in individual (or portioned portions of the) buffers 224. It is understood that the above is merely one illustrative example to which the disclosed subject matter is not limited.

In the illustrated embodiment, the offload processing circuit 202 may include an address controller 228 configured to manage how the data is read from the memory unit 204 and written to the buffers 224. In some embodiments, the address controller 228 may also be configured to manage how the data is read from the buffers 224 for error correction code computing. In some embodiments, the offload processing circuit 202 may include an index table 230 that includes a pre-stored sequence in which the buffers 224 will be accessed.

The offload processing circuit 202 may include a plurality of error code computation circuits 226. These error code computation circuits 226 may be configured to compute the error correction code without additional processing by the host processing device. In the illustrated embodiment, the error code computation circuits 226 may primarily include multiple-add circuits. In various embodiments, the error code computation circuits 226 may be embodied as lookup tables or bitwise XOR gates. It is understood that the above are merely a few illustrative examples to which the disclosed subject matter is not limited.

In some embodiments, the system 200 may perform the creation of the error correction code in three stages: read, process, and write. In the read stage the data elements (including the parity elements if rebuilding) may be read from the memory 204 and placed into the buffers 224.

During the process stage, the address controller unit 228 may control the memory read according to the pre-stored index table 230 and read the correct data slices in the k buffers 224 simultaneously. This data may be fed to the error code computation circuits 226 for error correction calculation.

The detailed architecture of one possible embodiment of the error code computation circuitry 226 is shown it the exploded-view portion of the figure. The error code computation circuits 226 may include a pre-stored coefficients table 242 that corresponds to the desired parity calculation or information rebuild technique (e.g., Galois field (GF) calculations). The error code computation circuits 226 may also include k multipliers or multiply lookup tables 244 for fast multiply operations. The error code computation circuits 226 may also include an XOR or adder 246 tree structure. In one embodiment, each multiplier 244 may process one data element 252 (e.g., 8 bits of data). Ultimately, the error code computation circuits 226 may produce or output the error correction code 254 (or a portion thereof, as described below).

During the write stage, the error correction code 254 may be written back to the memory 204 as output 224. In various embodiments, the error correction code 254 may be written back to the memory 204 immediately after processing. It can be considered as adding one more pipeline stage after the XOR 246 tree. In such an embodiment, this may allow the system 200 to engage in pipelined data processing as opposed to discrete or atomic operations. In such an embodiment, this may speed up multi-pass operations, as described below. In some embodiments, since the data is partitioned when reading into the buffers 224, the data output is written back to the memory unit in a separate output partition.

In various embodiments, as, for example MSR code (n, k, m), there are k input data chunks (in an encode procedure), the input data as a whole may be larger than the internal buffers 224 size. In such an embodiment, the system 200 may employ multiple or 'p' passes to process the whole input dataset, where p is equal to the number of information/ parity slices partitioned for each information/parity element. In such an embodiment, the system 200 may partition the larger data set into p partitions, each having k or less than k data elements. In such an embodiment, each pass may involve reading, processing, and writing the error correction code associated with the respective partition.

In another embodiment, in which the number of data set is less than the total amount of the storage in the buffers 224, the data set may be mapped to k data elements, each less than the buffer size. In such an embodiment, the variable data element sizes may be processed by the system 200.

In yet another embodiment, in which the number of data elements is less than the k buffers 224 (and therefore k error code computation circuits 226), the number of error code computation circuits 226 may be dynamically altered. In such an embodiment, the pipeline of the system 200 may be dynamically altered to optimize latency as well as throughput. In such an embodiment, the number of error code computation circuits 226 may be adjusted to match the number of data elements (up to a maximum hardware limit). In such an embodiment, the multiply lookup tables 244 may be accessed every cycle. This parallelism across data elements (and therefore data nodes) is unlike a traditional CPU in which the number of operands in the SIMD instruction are fixed, and therefore the operands themselves must be manipulated to account for inconveniently odd numbers of data elements.

Figure 3B:
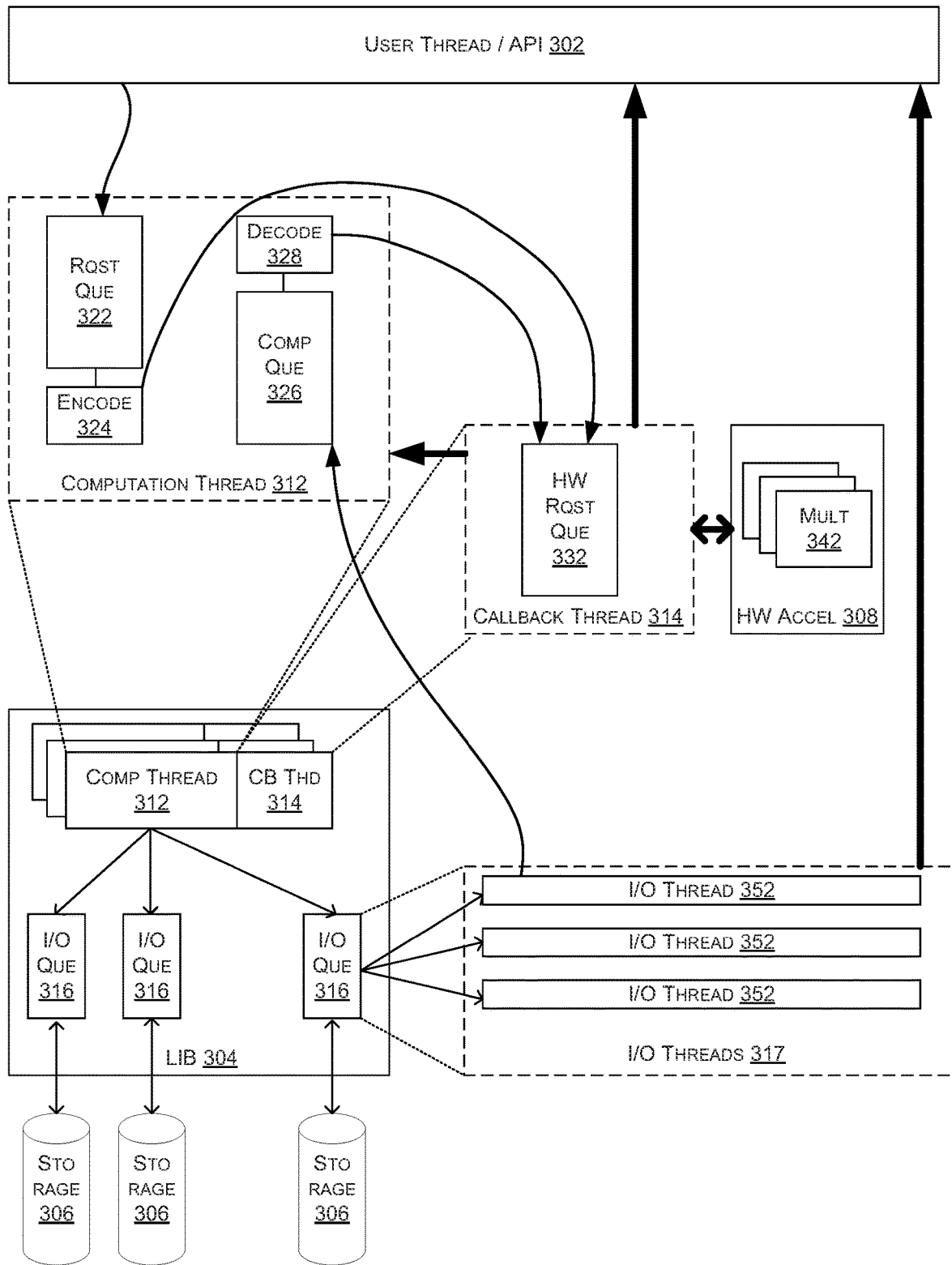

FIGS. 3A & 3B are block diagrams of example embodiments of a system 300 in accordance with the prior art. FIG. 3A illustrates a simplified version of the system 300 without the ROPD, whereas FIG. 3B illustrates the use of the ROPD within the system 300. FIGS. 3A & 3B illustrate the execution of instructions or software threads within systems 300 that utilize the error correction code computation described herein.

In the illustrated embodiment, the system 300 may include a main or user thread or application program interface (API) 302 that is performing some task that requires access to the data set (and hence data elements). In such an embodiment, the use thread 302 may be executed by the host processor.

In the illustrated embodiment, the system may include the LIB 304 which handles the computation thread of instructions 312 and interacts with the storage devices 306, via the I/O queues 316.

In an embodiment in which the offload processing device is not active, the competition thread 312 may receive a user request (placed in the request queue 322) to compute the error correction code (e.g., build a parity element or rebuild a data element). If encoding (build a parity element) is requested, when the request reaches the encode operation 324, the host processing device may perform the encoding, and then cause the I/O queues 316, and their I/O threads 317 (individual I/O thread 352), to write the parity element to the respective storage medium 306. Likewise, a decode (rebuild a data element) is requested, when the needed remaining data elements (including the parity elements) are returned by the I/O threads 352 to the completion queue 326 and eventually reach the decode operation 328 (which is performed by the host processor).

In FIG. 3B, it is described how the hardware accelerator or offload processing device 308 interacts with the host processor (which is executing the threads 302, 312 and LIB 304). Again, the computation thread 312 may handles requests from the user thread 302. In such an embodiment, this may involve offloading the encode/decode computation to offload processing device 308.

As described above, each computation thread 312 may include a request queue 322 (enqueued by the user threads 302) and a completion queue 326 (enqueued by the I/O threads 317). In such an embodiment, the completion threads 312 may interact with the offload processing device 308.

For example, in the encode or parity creation scenario, the computation thread 312 may place the encoding request in the request queue 322. When the encoding request reaches the encode stage 324, instead of being processed directly by the host device, the computation thread 312 may offload the encoding request to the offload processing device 308. In one embodiment, this may be tracked via a callback thread 314. In such an embodiment, the offloading request may be placed into a hardware acceleration or offload request queue 322. As the request exists the hardware acceleration queue 322, the callback thread 314 may make a DMA request to the offload processing device 308. The offload processing device 308 may include the error code computation circuits 342, as described above. Upon completion, the callback thread 314 may report back to the computation thread 312, which in turn may report to the user thread 302. At which point, the I/O threads 317 may write the encoded data to the storage 306.

In the example of a decode or rebuilding operation, the computation thread 312 request the data from the I/O threads 317. It may then place the request in the completion queue 326. When the request reaches the decode stage 328, instead of being processed directly by the host device, the computation thread 312 may offload the decoding request to the offload processing device 308. In one embodiment, this may be tracked via a callback thread 314. In such an embodiment, the offloading request may be placed into a hardware acceleration or offload request queue 322. The offload processing device 308 may receive the existing data elements via an DMA from the I/O threads 317. As the request exists the hardware acceleration queue 322, the callback thread 314 may report back to the computation thread 312 and/or the user thread 302.

FIGS. 4A & 4B are timing diagrams of an example embodiment of a system in accordance with the disclosed subject matter. FIG. 4A illustrates a timing diagram 400 of an encode or parity creation operation. FIG. 4B illustrates a timing diagram 401 of a decode or rebuilding operation. In various embodiments, these timing diagrams may be created by the system 300 of FIGS. 3A & 3B. It is understood that the above is merely one illustrative example to which the disclosed subject matter is not limited.

In the illustrated embodiments, row 402 illustrates a possible timing of the user threads. In the illustrated embodiments, row 404 illustrates a possible timing of the computation threads. In the illustrated embodiments, row 406 illustrates a possible callback of the user threads. In the illustrated embodiments, row 408 illustrates a possible timing of the input/output (I/O) threads.

In FIG. 4A diagram 400 shows an embodiment of the thread stages and timing for encoding operations. In such an embodiment, the user thread 402 may enqueue an I/O write request (block 412) with the computation thread and then wait for the completion of the request (Block 414). In various embodiments, the host device may perform other operations (not shown) while waiting for completion (Block 414).

In such an embodiment, the computation thread 404 may dequeues the user request from request queue (Block 422) and enqueue the hardware or offload request to the queue (Block 424). The computation thread 404 may then wait for completion (Block 426).

In such an embodiment, the call back thread 406 may then dequeues the hardware acceleration request (Block 432), launches encoding operations (Block 434), waits (Block 436), and notifies the completion queue when the operation is finished (Block 438). In the illustrated embodiment, the computation thread 404 may then enqueues I/O request to I/O queue (Block 428).

In such an embodiment, the I/O thread 408 may perform I/O operation by dequeuing the I/O request (Block 442), and issuing the request to the storage devices (Block 444). After waiting for the data to be written (Block 446), the I/O thread 408 may notify the user thread of its completion (Block 448). It is understood that the above is merely one illustrative example to which the disclosed subject matter is not limited.

In FIG. 4B diagram 401 shows an embodiment of the thread stages and timing for decoding operations. In such an embodiment, the user thread 402 may enqueue an I/O read request (block 413) with the computation thread and then wait for the completion of the request (Block 415). In various embodiments, the host device may perform other operations (not shown) while waiting for completion (Block 415).

In such an embodiment, the computation thread 404 may dequeues the user request from request queue (Block 422) and enqueue the I/O request to the queue (Block 428). The computation thread 404 may then wait for completion (Block 427).

In such an embodiment, the I/O thread 408 may perform I/O operation by dequeuing the I/O request (Block 442), and issuing the request to the storage devices (Block 444). After waiting for the data to be read (Block 447), the I/O thread 408 may notify the completion thread 406 of its completion by enqueuing the hardware acceleration request (Block 449).

In such an embodiment, the call back thread 406 may then dequeues the hardware acceleration request (Block 432), launches decoding operations (Block 435), waits (Block 436), and notifies the user thread 402 when the operation is finished (Block 439). It is understood that the above is merely one illustrative example to which the disclosed subject matter is not limited.

Figure 5:
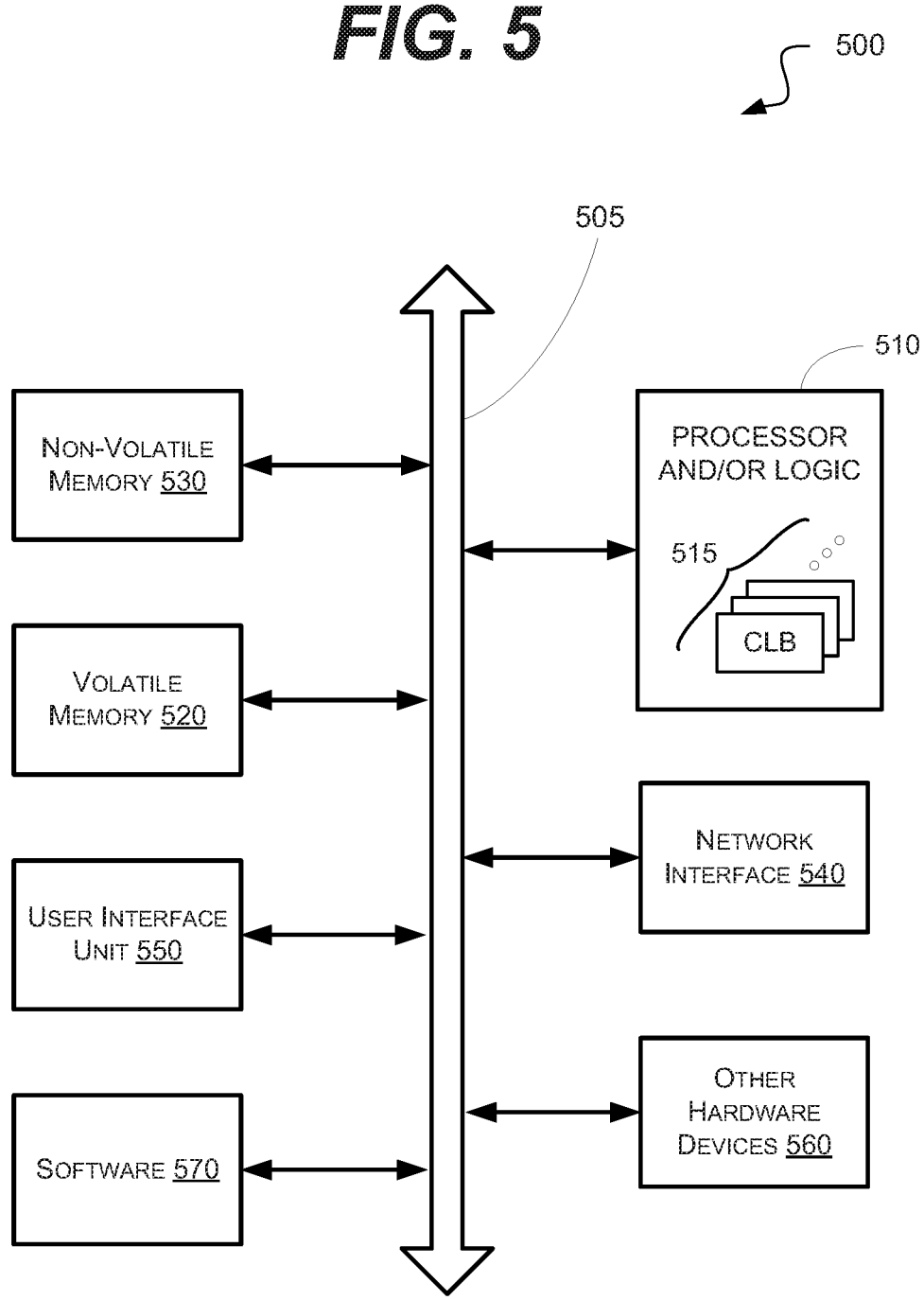
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM)). The information processing system 500 according to the disclosed subject matter may further include a non-volatile memory 530 (e.g., a hard drive, an optical memory, a NAND or Flash memory). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.1 in. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 500 according to the disclosed subject matter may further include a user interface unit 550 (e.g., a display adapter, a haptic interface, a human interface device). In various embodiments, this user interface unit 550 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540) of the information processing system 500. In such an embodiment, the information processing system 500 may include one or more native applications, which may be installed locally (e.g., within the non-volatile memory 530) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting but are illustrative only. Thus, the scope of the disclosed concepts is to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
 a host interface circuit configured to receive an offloading instruction from a host processing device configured to manage a distributed storage system, wherein the offloading instruction instructs the apparatus to compute an error correction code associated with data elements stored by an external distributed storage system;
 a memory interface circuit configured to receive the data elements from the external distributed storage system; and an error code computation circuit configured to, at least in part, compute the error correction code without additional processing by the host processing device.

2. The apparatus of claim 1, wherein the apparatus is configured to compute an error correction code by:
partitioning the data elements into sub-portions;
executing multiple passes, by sub-portion, of the data elements; and
aggregating an output of each pass to form the error correction code.

3. The apparatus of claim 1, wherein the memory interface circuit is configured to automatically write an output of the error code computation circuit to an external memory.

4. The apparatus of claim 1, wherein the data elements are associated with a number of data nodes of the distributed storage system, wherein a data node stores a portion of the data elements at a remote location; and
wherein the error code computation circuit is reconfigurable based upon the number of data nodes.

5. The apparatus of claim 1, wherein the error code computation circuit comprises:
a tree of alternating multiplication circuits and additional circuits.

6. The apparatus of claim 5, wherein the multiplication circuits comprise lookup tables; and
wherein the additional circuits comprise XOR gates.

7. The apparatus of claim 1, wherein the error code computation circuit is reprogrammable by the host processing device.

8. The apparatus of claim 1, wherein the error code comprises a Minimum Storage Regenerating (MSR) code.

9. A system comprising:
a memory configured to store data elements stored by an external distributed storage system;
a host processing device configured to configured to manage a distributed storage system and offload a computation of an error correction code to a reprogrammable processing device; and
the reprogrammable processing device configured to compute the error correction code, wherein the reprogrammable processing device comprises:
a reconfigurable pipeline that computes, at least in part, the error correction code and is reconfigured based upon a number of data elements.

10. The system of claim 9, wherein the host processing device is configured to, during operation:
execute a computation thread of instructions that generates a request to offload the computation of an error correction code to the reprogrammable processing device, and
create a callback thread of instructions to control the reprogrammable processing device, and
create at least one input/output (I/O) thread of instructions for either reading the data elements from or reading the error correction code to the memory.

11. The system of claim 10, wherein, when the host processing device is configured to, when generating a parity data element:
halt the computation thread in response to enqueuing an offload request;
in response to the callback thread indicating that the reprogrammable processing device has computed the error correction code, restarting the computation thread; and
cause the I/O thread to write the error correction code to the memory as the parity data element.

12. The system of claim 11, wherein, when the host processing device is configured to, when reconstructing a data element:
cause the I/O thread to read data elements from the memory to the reprogrammable processing device;
halt the computation thread until the I/O thread indicates that the reprogrammable processing device has received the data elements; and
notifying a user thread of instructions that the data element has been reconstructed in response to the reprogrammable processing device has computed the error correction code.

13. The system of claim 9, wherein the reprogrammable processing device comprises:
a host interface circuit configured to receive an offloading instruction from the host processing device;
a memory interface circuit configured to receive the data elements;
a memory buffer circuit configured to temporarily store the data elements;
an error code computation circuit configured to, at least in part, compute the error correction code without additional processing by the host processing device.

14. The system of claim 9, wherein the host processing device and the reprogrammable processing device are configured to communicate via direct memory access.

15. The system of claim 9, wherein the memory and the reprogrammable processing device are configured to communicate via direct memory access.

16. An apparatus comprising:
a host processing device configured to offload a computation of an error correction code to an offload processing device;
an input/output (I/O) system configured to read and write data elements to a system of distributed storage devices; and
the offload processing device configured to compute the error correction code based, at least in part, upon data elements stored by the distributed storage devices, wherein the offload processing device comprises:
a memory interface circuit configured to receive the data elements; and
an error code computation circuit configured to, at least in part, compute the error correction code without additional processing by the host processing device.

17. The apparatus of claim 16, wherein the offload processing device is configured to compute an error correction code by:
partitioning the data elements into sub-portions;
executing multiple passes, by sub-portion, of the data elements; and
aggregating an output of each pass to form the error correction code.

18. The apparatus of claim 16, wherein the data elements are associated with a number of storage devices; and
wherein a number within the error code computation circuit is reconfigurable to match the number of data nodes, such that, there is a correlation between the data nodes and the error code computation circuit.

19. The apparatus of claim 16, wherein the error code computation circuit comprise a tree of alternating multiplication circuits and addition circuits; and
wherein the multiplication circuits comprise lookup tables, and
wherein the additional circuits comprise XOR gates.

20. The apparatus of claim 16, wherein the offload processing device is configured to:

in response to an encode request, compute the error correction code as a parity element, and in response to a decode request, compute the error correction code as a rebuilt data element.

* * * * *